United States Patent [19]

Bacot et al.

[11] 4,426,681

[45] Jan. 17, 1984

[54] PROCESS AND DEVICE FOR MANAGING THE CONFLICTS RAISED BY MULTIPLE ACCESS TO SAME CACHE MEMORY OF A DIGITAL DATA PROCESSING SYSTEM HAVING PLURAL PROCESSORS, EACH HAVING A CACHE MEMORY

[75] Inventors: Pierre C. A. Bacot, Chaville; Michel Isert, Paris, both of France

[73] Assignee: CII Honeywell Bull, Paris, France

[21] Appl. No.: 227,222

[22] Filed: Jan. 22, 1981

[30] Foreign Application Priority Data

Jan. 22, 1980 [FR] France ............... 80 01351

[51] Int. Cl.³ ............... G06F 13/00; G06F 15/16
[52] U.S. Cl. ............................................. 364/200
[58] Field of Search .................. 364/200 MS File

[56] References Cited

U.S. PATENT DOCUMENTS

| | | | |
|---|---|---|---|
| 3,555,513 | 1/1971 | Hauck et al. | 364/200 |
| 3,735,360 | 5/1973 | Anderson et al. | 364/200 |
| 3,771,137 | 11/1973 | Barner et al. | 364/200 |
| 4,056,844 | 11/1977 | Izumi | 364/200 |
| 4,136,386 | 1/1979 | Annunziata et al. | 364/200 |
| 4,228,503 | 10/1980 | Waite et al. | 364/200 |
| 4,325,116 | 4/1982 | Kranz et al. | 364/200 |

FOREIGN PATENT DOCUMENTS 9938 4/1980 European Pat. Off. .

OTHER PUBLICATIONS

IBM Technical Disclosure Bulletin, vol. 14, No. 10, Mar. 1972, New York; R. S. Capowski et al., Multiprocessing Storage Priority Network, pp. 3141–3142.

Primary Examiner—Raulfe B. Zache
Attorney, Agent, or Firm—Lowe, King, Price & Becker

[57] ABSTRACT

A data processing system includes at least two processors, each having a cache memory containing an index section and a memory section. A first processor performs a task by deriving internal requests for its cache memory which also may respond to an external request derived from the other processor which is simultaneously processing a task. To avoid a conflict between the simultaneous processing of an internal request and of an external request by the same cache memory, one request may act on the other by delaying its enabling or by suspending its processing from the instant at which these requests are required to operate simultaneously on the index section or the memory section of the cache memory of the processor affected by these requests. Thereby, the tasks are performed by the system at an increased speed.

15 Claims, 7 Drawing Figures

PROCESS AND DEVICE FOR MANAGING THE CONFLICTS RAISED BY MULTIPLE ACCESS TO SAME CACHE MEMORY OF A DIGITAL DATA PROCESSING SYSTEM HAVING PLURAL PROCESSORS, EACH HAVING A CACHE MEMORY

TECHNICAL FIELD

The present invention relates generally to a process of and apparatus for managing conflicts raised by multiple access to the same cache memory of a digital data processing system including plural processors, each of which has a cache memory, and, more particularly, to such a process and apparatus wherein there is simultaneous processing of plural tasks respectively performed by plural processors from the time when performance of these tasks causes them to have recourse to the same cache memory.

BACKGROUND ART

Cache memories (high speed, low capacity memories) are incorporated in data processing systems to reduce data transfer times. Typically, multiprocessor data processing systems comprise a single cache memory per principal memory unit. A problem arises when multiple access from plural processors to the same cache memory is desired.

This problem is commonly resolved by means of hold-over lines or queues governed frequently by priority circuits. In all cases, hold-over or waiting periods associated with the lines or queues have an effect on the processing periods because there is no way of which I am aware of authorizing multiple access operations to a single cache memory.

In accordance with another prior art concept, use of cache memories is decentralized beyond the principal memory units, a result achieved by associating a cache memory with each processor of the system. This system is disclosed in an article having the title "Performance Results for an M.I.M.D. Computer Organization Using Pipeline Binary Switches and Cache Memories", published in the British Journal "PROC. IEE", Volume 125, Number 11, November 1978. In this article there is no statement posing or resolving the problem of data coherence stored in the different cache memories and in the principal memory unit or units of the system. This problem has been posed and resolved in the commonly owned French Patent Application No. 78 20206, filed July 6, 1978. The solution of the data coherence problem set forth in the French Application does not resolve a problem posed in multiple access to a cache memory of a single processor.

It is an object of the invention to govern multiple access actions to a memory unit of a single cache memory to prevent conflicts while promoting the multiple access actions to increase the speed of simultaneous handling of several tasks respectivvely performed by several processors.

When a processor of a digital data processing system processes a task, it enters into dialogue with a memory array of the system. The memory array includes at least one principal memory unit and intrinsic resources of the processor, such as a cache memory. This dialogue results in the processor deriving requests for access to data contained in the memory array. The processing of these requests has recourse under priority to the intrinsic resources of the processor, and, if subsequently applicable, to the remainder of the system via a principal multiple lead or bit bus interconnecting the different units of the system.

If the system comprises at least one additional processor, the latter is equally likely to derive requests for access to data while processing a task. As long as the two processors of the system have recourse to their own resources, there is no conflict between the task processing operations performed by the two processors.

However, while a request is being processed, a first processor deriving this request may attempt to access a data item not contained in its own cache memory. In such case, the request deriving processor calls on the remainder of item contained, e.g., either (1) in the principal memory unit, or (2) in the cache memory of a second processor of the system, or (3) more commonly, in another cache memory of a processor of the system. The calls to the remainder of the system occur if the data item sought has been modified in the cache memory of the first processor without an image of the data item in the principal memory having been modified in accordance with the procedure specified in the aforesaid patent application. It is possible that the another cache memory is processing an internal request derived by the processor associated with the another cache memory when the another cache memory receives a request from the first processor for access to the stored data in the another cache memory. The another cache memory considers the request for access from the first processor as a so-called external request because this request is not derived by its associaterd processor.

In these circumstances, a conflict may arise at the level of the another cache memory of the system. The conflict is between the processing of an internal request derived by the associated processor and the processing of an external request derived from the first processor of the system.

An object of the invention is to govern this kind of conflict while promoting simultaneous implementation of internal and external requests to a single cache memory of the system that receives the conflicting requests.

To this end, the invention proposes a process for managing the conflicts raised by multiple access to a single cache memory of a digital data processing system including at least: one main memory unit, two processors, an input-output unit and a main connector bus connecting these different elements of the system. Each processor includes resources such as a cache memory having a memory section and an index section for identification of the data contained in the memory section. The processing of a task by a first processor involves deriving at least one request for gaining access to at least one data item present either in the cache memory of the first processor or of another processor, or in the memory unit of the system. This request is enabled by the cache memory of the first processor which considers the request as internal. This internal request is executed by the cache memory of the first processor. The cache memory of the first processor is able to receive an external request derived by another processor of the system that is processing another task. The another cache memory requests access to at least one data item in the cache memory of the first processor by means of the connector bus.

To avoid a conflict between the processing operations of internal and external requests on the another cache memory while promoting simultaneous processing of these requests, the process involves enabling an external request derived by the first processor and addressed in particular to the second cache memory. All of the other cache memories of the system take this external request from the first processor into account once the request has been enabled. This external request is analyzed by the other cache memories. The external request is processed by the cache memory affected by the external request, i.e., the second cache memory. Simultaneous processing by the second cache memory of internal and external requests is authorized if these requests are addressed to different resources of the processor such as a memory section and an index section of the second cache memory. An internal request currently being processed by the second cache memory is interrupted or enabling is prevented if the current processing of an external request requires all of the resources of the processor in question. Alternatively, an external request currently being processed by the second cache memory is interrupted or enabling of an external request is delayed if the current processing of an internal request requires all of the resources of the processor in question.

According to another feature of the invention, execution of an internal request or of an external request by a cache memory of the system involves processing a series of read and write operations during a series of cycles defined by the cache memory. The first of these processing cycles is initiated in response to an enabled internal request or of an enabled external request. Either an internal request or an external request is enabled during a first processing cycle. Priority is awarded to enabling of an external request over an internal request if these requests must be taken into account at the same time by a single cache memory. Simultaneous processing of these requests is authorized during the following cycles if the requests have recourse to different resources of the cache memory of the processor.

According to another feature of the invention, at the beginning of each processing cycle a determination is made, as a function of the state of the system, as to whether the next operation to be performed involves processing an internal request or enabling another internal request, or if the next operation involves processing an external request or enabling another external request. The process involves establishing at least one enabling condition as a function of the nature of the operation required by the processing of an external request then being executed. This condition is established for either the next processing operation of an internal request or for the next operation involving enabling another internal request. There is also established at least one enabling condition as a function of the nature of the operation required by the processing of an internal request then being executed. This condition is established for either the next processing operation of an external request or for the next operation enabling another external request.

According to another feature of the invention, the process involves delaying, at the beginning of a processing cycle, the next processing operation of an internal request and thus interrupting this internal request. In particular, the delay is provided for access demand to the connector bus if the bus is already occupied or if the external request then being executed has reserved the resources of the cache memory; resources of the cache memory thay may have been reserved are the memory and index sections. This action prevents a conflict of simultaneous access to the recourses.

According to another feature of the invention, the process involves delaying, at the start of a processing cycle, enabling of an internal request relating to a read operation for a data item of the cache memory of the processor deriving the internal request. This delay occurs if an enabling external request operates on the index section or memory section of the cache memory of the processor.

According to another feature of the invention, the process involves delaying, at the start of a processing cycle, enabling of an internal request relating to a write operation for a data item contained in the cache memory of the processor. This delay occurs if an enabled external request is already operating on the memory section or the index section of the cache memory of the processor, or will be operating on the memory section or the index section of the cache memory in the following processing cycle of the system.

According to another feature of the invention, the process involves delaying enabling of another external request if the operation called for by the processing of an internal request is a data transfer operation on the connector bus connected between the cache memory of the processor and the main memory unit of the system deriving the internal request.

According to another feature of the invention, the process involves interrupting, at the start of the processing cycle, the next processing operation of an external request. This interrupt occurs if the processing operation affects the memory section of the cache memory while an internal request already operates on the memory section of the cache memory of the processor.

The invention also envisages a device for application of the process in a system comprising at least: one main memory unit and two processors, each of which has intrinsic resources such as a cache memory. The cache memory includes a memory section and an index section for identifying the data contained in the memory section. Each cache memory of the system comprises first means for assuring synchronization between the different operations performed by the cache memory to assure processing of an internal request derived by a processor co-ordinated with this cache memory. The cache memory also includes second means for assuring synchronization between the different operations performed by the cache memory to assure processing of an external request transmitted by another processor of the system. A third means assures a dialogue from the second means to the first means by deriving signals for interrupting the operation of the first means. A fourth means assures a dialogue from the first means to the second means by deriving signals for interrupting the operation of the second means.

According to another feature of the device, the first means of the cache memory comprises series connected flip-flops in combination with a timer or clock that derives periodic timing pulses supplied to the flip-flops to establish a succession of cycles. A gate circuit associated with each flip-flop enables orders for switching the associated flip-flop. Internal control circuits have output terminals connected to each of the gate circuits to determine the switching conditions of each flip-flop as a function of the operation to be processed by the cache memory.

According to a further feature of the device, the second means of the cache memory includes a number of series connected flip-flops responsive to the timing pulses. A gate circuit associated with each flip-flop enables the switching order for the associated flip-flop. External control circuits supply signals to each of the gate circuits to determine the switching conditions of each flip-flop as a function of the operation to be processed by the cache memory.

According to another feature of the device, the third means comprises a first circuit for requesting interruption of the operation of the first synchronizing means provided for processing an internal request. At least one output signal of the first interruption request circuit is coupled to each circuit for enabling the first means.

According to another feature of the device, the fourth means comprises a second circuit for requesting interruption of the operation of the second synchronizing means provided for processing an external request. At least one output signal of the second interruption request circuit is coupled to an input terminal of each enabling circuit of the second means.

A substantial advantage of the invention involves authorizing maximum overlap between the processing by a single cache memory of an internal request, as well as of an external request. This makes it possible to increase the speed of processing of the tasks performed by a processor and allows optimum utilization of the connector bus, thereby improving the performance factors of the system.

The above and still further objects, features and advantages of the present invention will become apparent upon consideration of one specific embodiment thereof, especially when taken in conjunction with the accompanying drawings.

BEST MODE FOR CARRYING OUT THE INVENTION

Figure 1:
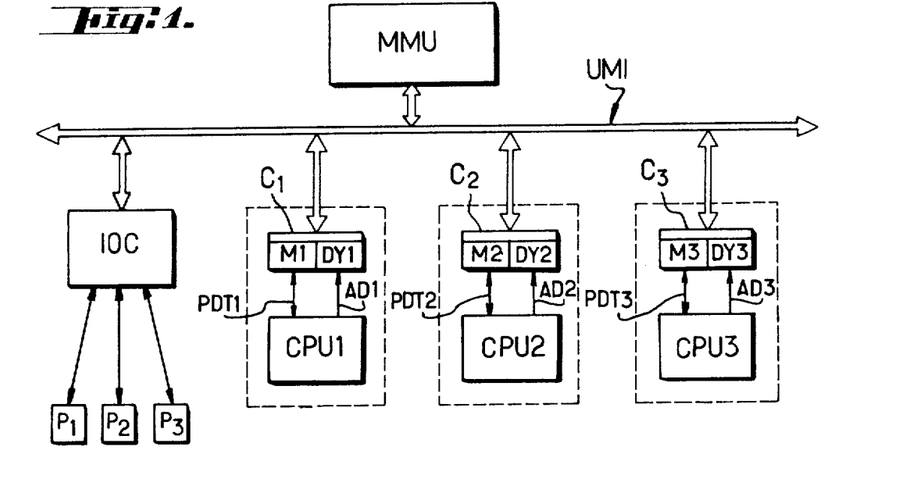
FIG. 1 is a block diagram of a digital data processing system that performs the process of the invention.

The digital data processing system illustrated in FIG. 1 and to which is applied the process in accordance with the invention comprises: (1) a main memory unit MMU, (2) several processors CPU1, CPU2 and CPU3, respectively including cache memories C1, C2 and C3, as well as other resources (not shown), and (3) an input-output unit IOC connected to several peripherals P1, P2 and P3. Units MMU and IOC, as well as processors CPU1, CPU2 and CPU3 are interconnected by main multi-bit connector bus UMI. Each of cache memories C1, C2 and C3 includes a memory section M and an index section DY for identifying the data stored in memory section M. Memory sections M1, M2, M3 and index sections DY1, DY2, DY3 are respectively provided in processors CPU1, CPU2 and CPU3. In a generalized case, N processor units CPU1, CPU2 . . . CPUk . . . CPUN are provided, where k is selectively every one of 1 to N, inclusive. Processor unit CPUk includes cache memory Ck, which in turn includes memory section Mk and index section DYk. Data signals are coupled via leads PDTk between processor CPUk and memory section Mk while address signals are coupled via leads ADk between processor CPUk and index section DYk, where K=1, 2 . . . n.

As stated, the execution of a task by a selected one of the processors CPU1, CPU2 or CPU3 is performed by the selected processor deriving requests calling for access to data. The data may be contained in any of: (1) resources of the processor deriving the request, in particular in its cache memory, (2) in the resources of the other processors, or (3) in the main memory unit MMU.

Figure 2:
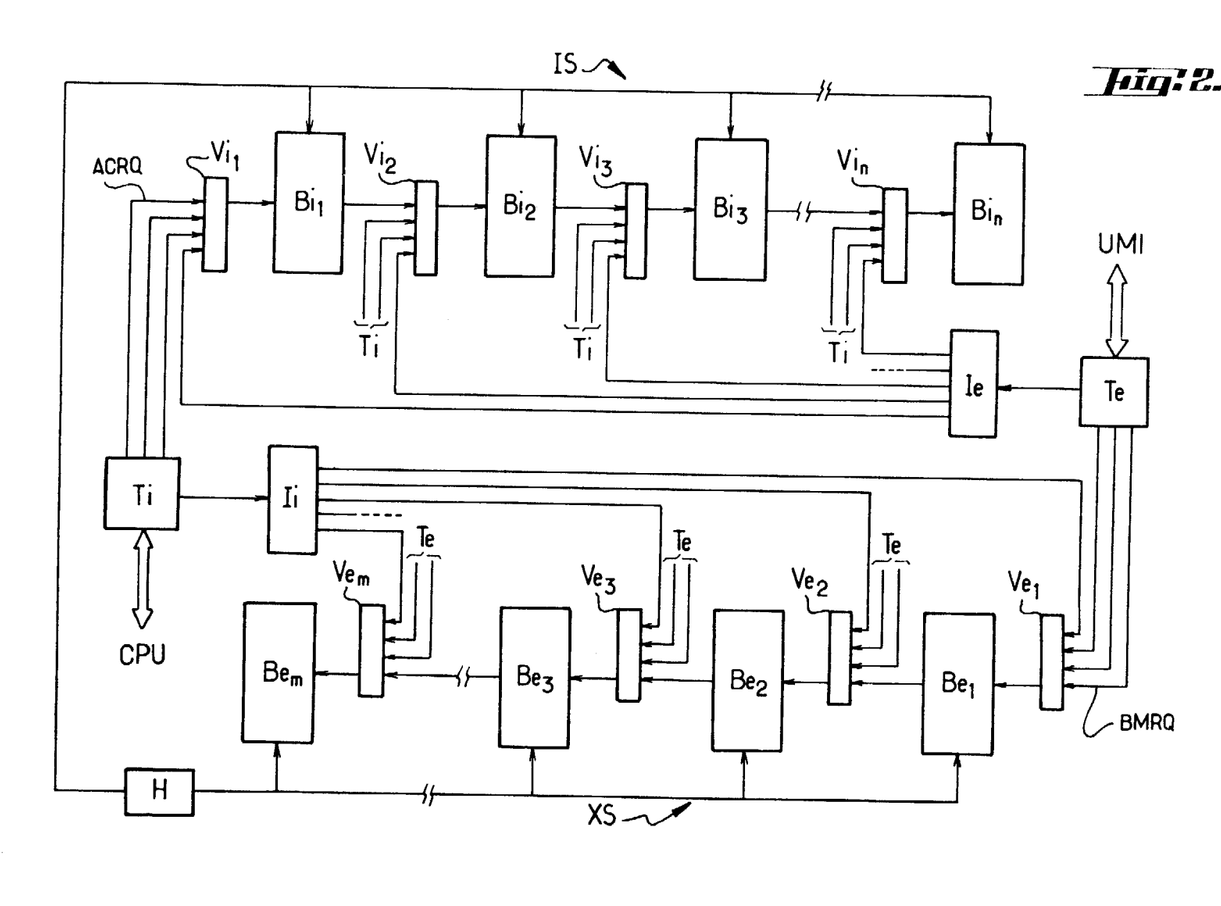
FIG. 2 is a block diagram of a controller included in each cache memory system, which controller enables execution of the process in accordance with the invention.

To put the process into operation in accordance with the invention to improve the implementation speed of the tasks performed by one of processors CPU1, CPU2 or CPU3, each of cache memories C1, C2 and C3 is equipped with a control circuit illustrated diagrammatically in FIG. 2. The control circuit includes an internal sequencer IS (first means) for assuring synchronization of the operations to be performed by the cache memory during the processing of an internal request. An external sequencer XS (second means) assures synchronization of the operations performed by the cache memory during processing of an external request. Synchronizing circuits Ie (third means) and dialogue circuits Ii (fourth means) connected between sequencers IS and XS respectively allow simultaneous processing of internal and external requests by a single cache memory. Circuits Ie and Ii also may interrupt the operation of either the internal sequencer or of the external sequencer as soon as first and second operations respectively resulting from processing two internal and external requests cannot be performed at the same time.

Each internal sequencer IS essentially comprises several series connected flip-flops Bi1, Bi2 . . . Bin, each of which is simultaneously responsive to periodic clock signals derived from a clock source H. Each flip-flop Bi1, Bi2 . . . Bin is respectively associated with a separate gate circuit Vi1, Vi2 . . . Vin. Each gate circuit Vi1, Vi2 . . . Vin enables switching of its associated flip-flop Bi1, Bi2 . . . Bin as a function of the state of several different input signals to the particular gate circuit.

Gate circuit Vik for flip-flop Bik has one input terminal connected for an output terminal of flip-flop Bi (k−1), two input terminals responsive to two different output signals of internal control circuit Ti and one input terminal responsive to sequential output signals of external synchronizing circuit Te; where k is selectively from 2 to n. Synchronization Ie includes n output terminals on which are sequentially derived signals that are applied individually to flip-flops Bi1, Bi2 . . . Bin in numbered order, whereby the output terminal of sequencer Ie is coupled to an input terminal of gate circuit Biq, where q is every integer from 1 to n, inclusive, Sequencer Ie is triggered in response to a signal from external controller Te, in turn responsive to a signal from bus UMI indicating that a data signal is being coupled by the bus to processor CPUk containing the cache memory Ck, illustrated in FIG. 2. Gate circuit Vi1 is similarly responsive to the two output signals of controller Ti and the first output signal in the sequence derived from synchronizer circuit Ie; however, gate circuit Vi1 is responsive to an internal initializing signal ACRQ derived from controller Ti, in turn responsive to control signals from the processor unit CPUk associated with cache memory Ck, assumed to be illustrated in FIG. 2. Controller T1 is also responsive to a control signal from an intermediate data word register DTOR (not shown) that is a conventional part of cache memory Ck. In response to register DTOR containing a data word to be written into or read from cache memory Ck, register DTOR derives a signal that is coupled to controller Ti. Processor unit CPUk derives several control signals that are coupled to controller Ti; exemplary of an additional signal is a signal which indicates that processor unit CPUk is processing a data word. Controller Ti responds to the several control signals from processor unit CPUk and cache memory C1 to derive signals that are coupled in parallel to each of gate circuits Vi1, Vi2 . . . Vin. Gate circuit Vi1 responds to a binary one value for signal ACRQ, and binary zero values for other signals from controller Ti, as well as from the output signal of synchronizer Ie coupled to the gate circuit, to feed an enable signal to the input of flip-flop Bi1 so flip-flop Bi1 changes state in response to each succeeding pulse from clock source H, until the enable signal is removed. Gate circuits Vik respond to different combinations of binary one and zero values for the output signals of controller Ti, as well as a binary one value for the output signal of flip-flop Bi (k−1), and a binary zero value for the output signal of synchronizer Ie coupled to the gate circuit to feed an enable signal to flip-flop Bik so flip-flop Bik changes state in response to each succeeding pulse from clock source H until the enable signal is no longer derived from gate Vik due to a change in the input signals thereof. The combination of signals to control enabling of gates Vi1, Vi2 . . . Vin will become apparent infra.

Assume that processor CPU1 derives an internal request for its cache memory C1. Control circuit Ti responds to the internal request from CPU1 to derive signal ACRQ that is coupled through gate circuit Vi1 to an input terminal of flip-flop Bi1. Coupling of signal ACRQ through gate circuit Vi1, for example upon conclusion of the processing of a preceding internal request, starts internal sequencer IS of the cache memory C1. Circuit Ti supplies the different enabling circuits Vi1, Vi2 . . . Vin with signals indicating the conditions for switching those flip-flops having states that do or do not authorize, at the start of each processing cycle, enabling of an internal request or the operation called for by an already enabled internal request. The beginning of each processing cycle is defined by two consecutive pulses transmitted by the clock H.

If the conditions indicated by the signals coupled to gate circuit Vi1 are fulfilled, gate circuit Vi1 authorizes switching of flip-flop Bi1 when a clock pulse is supplied to the flip-flop by clock H. The flip-flop Bi1 changes state again in response to the following clock pulse if gate circuit Vi1 remains enabled. The following clock pulse enables switching of the second flip-flop Bi2 if the enabling conditions applied to the input terminals of gate circuit Vi2 are fulfilled, and so on. The conditions for enabling of gate circuits Vi1, Vi2, Vi3, etcetera, are described infra in connection with FIGS. 3-7.

One flip-flop of the internal sequencer IS is associated with processing an internal request during each processing cycle defined by the clock H. The state of the flip-flop associated with a processing cycle determines whether an internal request is enabled or if a currently derived internal request signal for implementation of an operation is to remain enabled. Of course, the state change of a flip-flop is part of the condition for enabling switching of the following flip-flop in sequencer IS.

In analogous manner, external sequencer XS of cache memory Ck comprises series connected flip-flops Be1, Be2 . . . Bem, driven in parallel by pulses of clock H. Sequencer XS also includes control circuits Te for assuring enabling and processing of an external request. Circuits Ie and Ii for synchronization or dialogue between two internal and external sequences IS and XS are respectively controlled, for example, by control circuits Te and Ti, Control circuits Te and Ti are respectively in constant communication with connector bus UMI and the other circuits of the associated processor CPU. Synchronization or dialogue circuit Ie (first interruption call circuit) includes output terminals connected to the different input terminals of the gate circuit Vi1, Vi2 . . . Vin of the internal sequencer IS to impose an additional enabling condition for the gate circuits when an internal request signal is to be delayed or interrupted. In analogous manner, synchronization or dialogue circuit Ii controlled by the control circuits Ti includes output terminals connected to the different input terminals of gate circuits Vei, Ve2 . . . Ven of external sequencer XS to impose an additional enabling condition for delaying or interrupting an external request.

Gate circuits Ve1, Ve2 . . . Vem respectively provided for flip-flops Be1, Be2 . . . Bem are responsive to signals from external controller Te and sequentially derived signals from internal synchronizer Ii, as well as from clock source H and the output signal of the preceding flip-flop in a similar manner to the way circuits Vi1, Vi2 . . . Vin respond to controller Ti and synchronizer Ie. Thus, gate circuit Ver is responsive to two signals from controller Te, the output signal of flip-flop Be(r−1) and a sequentially derived output signal from terminal r of internal synchronizer Ii, where r is selectively every integer from 2 to m. Gate circuit Ve1 is responsive to the same two signals from controller Te and the signal at output terminal 1 of synchronizer Ii, but is responsive to signal BMRQ from controller Te; signal BMRQ is applied only to gate Ve1.

Synchronizer Ii sequentially derives signals on output terminals 1, 2 . . . k . . . m thereof in response to the processor associated with the illustrated cache memory processing a data word. To this end, controller Ti supplies a control signal to synchronizer Ii to trigger the synchronizer to derive the sequential signals supplied to flip-flops Be1, Be2 . . . Bem.

Figure 4:
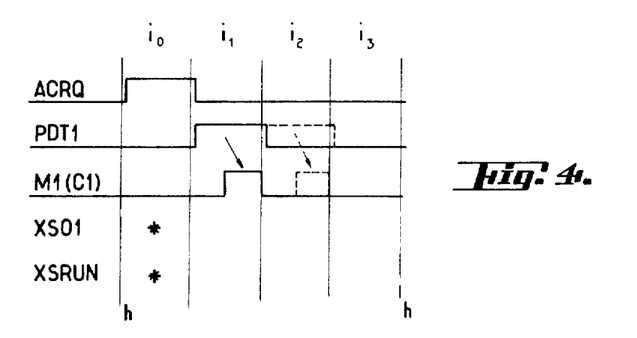
FIG. 4 is a diagrammatic illustration of different signals in the system to show processing of an internal request during writing of a data item contained in the cache memory of a processor deriving the internal request.
Figure 5:
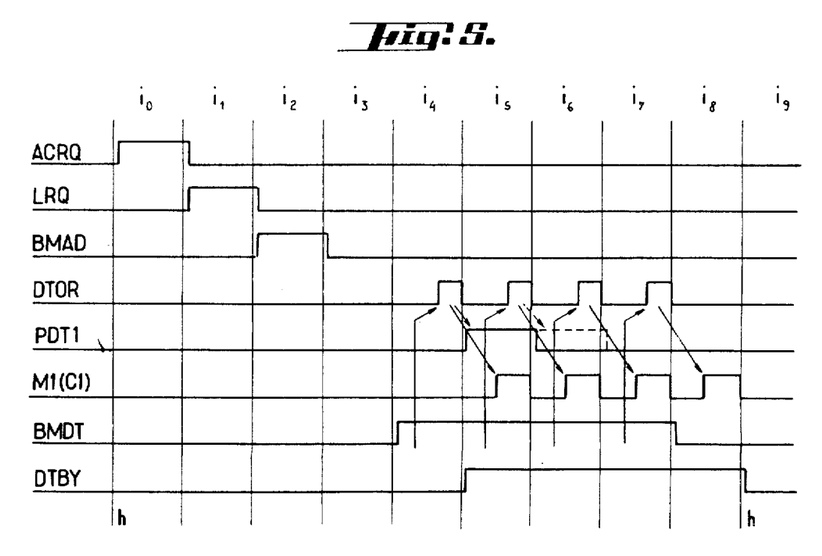
FIG. 5 is a diagrammatic illustration of different signals in the system to show processing of an internal request during reading of a data item contained in the cache memory of the processor deriving the internal request.

The internal requests derived by a processor and processed by its cache memory may relate, e.g., to (1) reading a data item contained in the cache memory of the processor deriving the internal request (FIG. 3), (2) writing a data item contained in the cache memory of the processor deriving the internal request (FIG. 4), and (3) reading a data item not contained in the cache memory of the processor deriving the internal request, that is, reading a data item present in the cache memory of another processor or in the main memory unit MMU of the system (FIG. 5).

Figure 3:
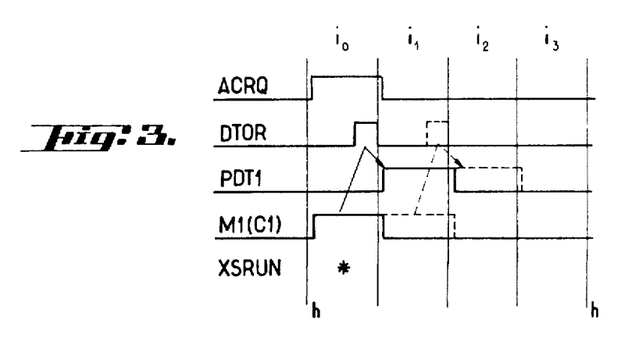
FIG. 3 is a diagrammatic illustration of different signals in the system to show processing of an internal request during reading of a data item contained in the cache memory of a processor deriving the internal request.

The different internal requests will now be considered, assuming that the cache memory which is intended to process the internal requests may either be in the process of implementing an external request or may receive an external request while processing an internal request. Initially, consider that CPU1 is deriving an internal request for reading a data item contained in cache memory C1, (FIG. 3). This internal request is indicated by CPU1 deriving an internal request which is coupled to controller Ti. Controller Ti responds to the internal request to derive signal ACRQ which assumes a binary one level when the internal request is enabled by priority circuits (not illustrated) of CPU1. Signal ACRQ energizes internal sequencer IS of cache memory C1 which, on the basis of pulses from clock H, establishes a series of processing cycles i0, i1 . . . in.

The progress of the internal request is the following: during cycle i0, cache memory C1 authorizes simultaneous access to index section DY1 and to memory section M1 thereof (FIG. 1). Access to index section DY1 makes it possible to ascertain, from the address of the data item intended to be read by the processor CPU1, whether this data item is present in the memory section M1 of the cache memory C1. These two simultaneous access operations enable time to be saved if the data item sought by the processor CPU1 is actually present in the memory section M1 of cache memory C1. If the data item is in memory section M1, the data item is transferred as a word from the memory section M1 into a conventional buffer register DTOR (not shown) of cache memory C1. This operation is indicated by CPU1 deriving signal M1(C1) and register deriving signal DTOR which respectively have binary one values to indicate that the word is being processed by CPU1 and that the DTOR register is being utilized. Signals DTOR and M1(C1) are supplied to control circuit Ti which processes them for coupling to gates Vi1, Vi2 . . . Vin and synchronization circuit Ii. During the next cycle i1, under normal operation, the enabling conditions present at the input terminals of gate circuit Vi1 remain fulfilled, whereby flip-flop Bi1 changes state, for example from a zero to a one level at the beginning of the cycle i1. The one level of flip-flop Bi1 is indicated by the output signal of the flip-flop, which output signal is coupled to processor unit CPU1 to authorize processing by unit CPU1 of the following internal request operation involving transferring the word contained in the cache memory buffer register DTOR to processor CPU1 via multi-bit data lines PDT1 connecting the buffer register and processor. This operation is indicated by output signal PDT1 of control circuit Ti having a binary one level during cycle i1.

At the end of the cycle i1, the reading operation is concluded. However, if a double word is read, the second word of the double word is read during cycle i1 and transferred into the then unoccupied cache memory buffer register DTOR. The second word is then transferred to processor CPU1 during the following cycle i2 in response to switching of flip-flop Bi2 to the one state as authorized by the gate circuit Vi2. The transfer of the second word is depicted in FIG. 3 by dotted lines.

As previously described, implementation of internal request ACRQ by the cache memory C1 may possibly come into conflict with an external request denoted by BMRQ, derived by another or second processor of the system and addressed to cache memory C1.

Several cases may than arise:

(1) simultaneous calls for processing an internal request ACRQ derived by the processor CPU1 and an external request BMRQ originating from another processor, such as processor CPU2 and addressed by cache memory C1, (2) an internal request call ACRQ has already been enabled during cycle i0, after which an external request BMRQ occurs during cycles i1 and i2 of the processing of the internal request ACRQ, and (3) finally, an external request BMRQ may be in progress when an interrupted read request ACRQ lays claim to being taken into consideration by cache memory C1.

In case (1), only one of ACRQ or BMRQ is enabled. In accordance with the invention, an external request BMRQ has priority over internal request call ACRQ. In this case, the internal request signal ACRQ does not assume a binary one level and the internal request is held in abeyance. Processor CPU1 must retransmit a call for an internal request processing prior to enabling of signal ACRQ.

Figure 6:
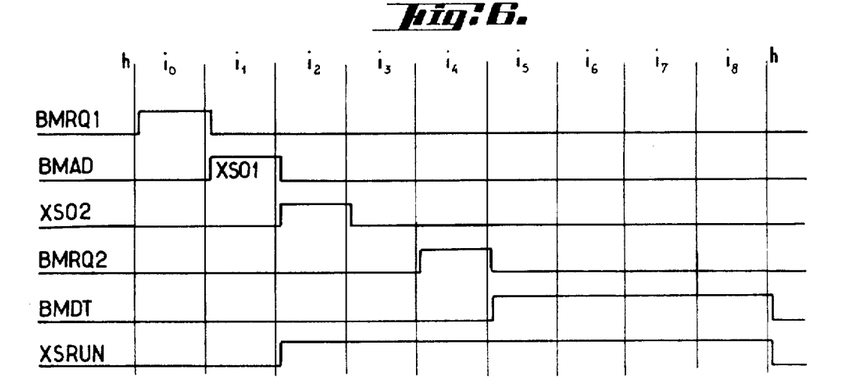
FIG. 6 is a diagrammatic illustration of different signals in the system to show processing of an external request during reading of a data item.
Figure 7:
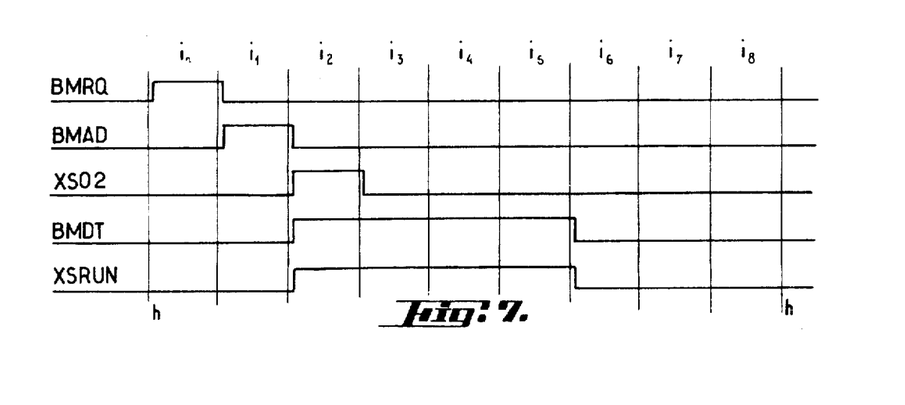
FIG. 7 is a diagrammatic illustration of different signals in the system to show processing of an external request during writing of a data item.

Case (2) is considered by referring to FIGS. 6 and 7, diagrammatic waveforms of the processing of an external request in the case of a reading operation and in the case of a writing operation, respectively.

When an external read request is enabled, it is divided into two external requests, BMRQ1 and BMRQ2, as indicated in FIG. 6 by signals BMRQ1 and BMRQ2 each having a binary one level if the corresponding request is enabled.

When a processor, for example the processor CPU2, reads a data item which is not contained in its cache memory C2, processor CPU2 derives a request which is evaluated as an external request by the other cache memories C1 and C3. In a first stage, processor CPU2 derives a read request BMRQ1 which, once it has been enabled, is coupled to controller Te; controller Te of memories C1 and C3 responds to the read request to derive signal BMRQ that is coupled to gate circuit Ve1. Thereby request BMRQ1 triggers external sequencers XS of cache memories C1 and C3 associated with processors CPU1 and CPU3. Triggering of external sequencers XS of cache memories C1 and C3 instigates sequential processing cycles i0, i1 . . . in in memories C1 and C3. As in the case of the internal sequencer IS of each memory Ck, flip-flops Be1, Be2 . . . Bem of the external sequencers XS of cache memories C1 and C3 are switched to provide processing of the external request from memory C2 as the request is identified as such by cache memories C1 and C3. The processing cycles defined by external sequencer XS of cache memories C1 and C3 are superimposed on the processing cycles of the internal sequencer IS of these cache memories because both sequencers operate simultaneously in response to clock signals from common clock source H.

Referring to FIG. 6 again and assuming that the external read request BMRQ1 is enabled during processing cycle i0 by memory C2, the next cycle i1 enables cache memories C1 and C3, to which this external request is addressed, to analyze this request to determine the nature of the request and receive the address of the data item to which access is required. This operation is indicated by signal BMAD having a binary one level to signal that address lines of connector bus UM1 are being used by the processor CPU2. Signal BMAD actually corresponds to the derivation by each external sequencer XS of cache memories C1 and C3 receiving this external request. During cycle i1, signal BMAD is denoted by signal XS01 that is transmitted by synchronization or dialogue circuit Ie to the different gate circuits Vi1, Vi2 ... Vin of the co-ordinated internal sequencers IS of memories C1 and C3.

A binary one value for signal XS01 during cycle i1 means that flip-flops Be1 of cache memories C1 and C3 receiving the external request have been switched from an initial binary zero state to a binary one state. At the end of cycle i1, flip-flops Be2 of cache memories C1 and C3 switch back to the initial binary zero states thereof, that is the enabling conditions present at the input terminals of the different gate circuits Ve2 associated with the flip-flops Be2 are fulfilled. During cycle i2, external request deriving processor CPU2 commands index sections DY1 and DY3 of cache memories C1 and C3 of processors CPU1 and CPU3 of the system to be read. This operation is depicted in FIG. 6 by signal XS02 having a binary one level during cycle i2. During cycle i2 each synchronization or dialogue circuit Ie of the different cache memories C1 and C3 receiving the external request supplies a signal XSRUN to the array of gate circuits Vi1, Vi2 ... Vin of the coordinated internal sequencer IS. The function of this signal XSRUN is described infra.

At the end of the cycle i2, one of cache memories C1 or C3 is actually affected by the external request, that is memory C1 or C3 contains the data items required by processor CPU2 deriving this request. If this is not the case, the data item sought by processor CPU2 is read from main memory unit MMU of the system. Assume that the data item sought is contained in cache memory C1 of processor CPU1. In these circumstances, cache memory C1 signals to processor CPU2 that it contains the data item sought; also, memory C1 signals that it is ready to transmit the data items to processor CPU1 via data lines of connector bus UMI. To this end, the cache memory C1 transmits a call for an answer. Once the call is enabled, signal BMRQ2 is derived to have a binary one level. To enable call signal BMRQ2 to be derived, the data lines of the connector bus UMI must be available. This enabling may, for example, occur during cycle i4. From this instant, cache memory C1 may transmit the data item called for by processor CPU2. Simultaneously with enabling of the call for an answer to signal BMRQ2 during cycle i4, the first information word to be read is transferred into intermediate buffer register DTOR (not shown) of the cache memory before being coupled to the data lines of connector bus UMI during cycle i5. In the case illustrated, because the information to be transmitted consists of four words, the data lines of connector bus UMI are used between cycles i5–i8 for coupling the read words from memory C1 to processor CPU2. It should be noted that under optimum operating conditions, call BMRQ2 for an answer can occur as early as cycle i3.

Referring to FIG. 7, the external request BMRQ in question is a write request. Once this write request has been validated and indicated by a binary one level for signal BMRQ, the external sequencers XS of the cache memories receiving this external request are placed in operation, as in the preceding case of processing of an external read request. During cycle i0, while enabling signal BMRQ is derived from controller Te, the processor deriving the external request transmits a signal indicating the address of the data which seeks access. The address signal is transmitted to all the cache memories via address lines of connector bus UMI. This operation occurs during cycle i1, and is denoted by signal BMAD which is derived by the processor deriving the external request. When signal BMAD has a binary one level, the address lines of connector bus UMI are in use by the processor transmitting the external request. Signal BMAD corresponds to derivation of signal XS01 by external sequencer XS of the cache memories receiving the address of the information sought. Signal XS01 is transmitted by synchronization or dialogue circuit Ie to the different gate circuits Vi1, Vi2 ... Vin of the associated internal sequencer IS.

The derivation of signal XS01 for the external write request has the same significance as in the case of signal XS01 for an external read request. During cycle i2 the index sections of the cache memories which have received the external request are read. This operation is depicted in FIG. 7 by a signal XS02 which has a binary one level during cycle i2. It is equally important to note that during cycle i2, the synchronization or dialogue circuits Ie of the cache memories which receive the external request supply signal XSRUN to the array of gate circuits Vi1, Vi2 ... Vin of the associated internal sequencer IS. The function of the signal XSRUN is described infra. During cycle i2, the first data item or word which is to be written by the processor deriving the external request is received in an intermediate register of each cache memory of the other processors. This operation is performed while the data lines of connector bus UMI are in use.

At the end of cycle i2, after the index sections of the cache memories have been read, making it possible to detect the presence of the information to which access is sought by the processor transmitting the external request, the cache memory which contains this required information is known. If the cache memory containing the information is not known, the write operation is performed in main memory MMU. It is then assumed that the information sought is contained in one of the cache memories.

If the processing of the external request is performed under normal conditions, flip-flops Be1, Be2 ... Bem of external sequencer SX of the cache memory processing the external request are activated to switch over consecutively if the different conditions for enabling the switching of the flip-flops are fulfilled. During the cycles i2 to i5, use is thus made of address lines in connector bus UMI to transfer four words at the rate of one word per cycle, in the example illustrated. Each of these words is written in the memory section of the cache memory in question, at the address specified by the processor transmitting the external request. Each word derived from the address lines of the connector bus UMI is stored in an intermediate register (not shown) of the cache memory before being written during the following cycle into the memory section of the cache memory affected by this external request. The write operation is concluded at the end of cycle i6.

Following these descriptions, it is possible to describe how an external request derived by processor CPU2, for example, is enabled and addresses cache memory C1 which is executing an internal read request.

An external request BMRK, either an external read or external write request, may be derived as early as cycle i1 and may be enabled by the derivation of signal BMRK by the processor which accesses external request BMRK to the address lines of connector bus UMI during cycle i2, as indicated by signal XS01, which follows signal BMRK. During cycle i2, the cache memory has either completed a read operation for a word or assures the transfer of a second word following a first word, which second word is to be read from buffer register DTOR of cache memory C1 to processor CPU1. There is no conflict between the external request and the transfer request and processing operations associated with them may overlap during cycle i1. During cycle i1, sequencers IS and XS of cache memory C1 are decoupled from each other and therefore function independently of each other.

For case (3), the internal read request ACRQ (FIG. 3) may be enabled as early as cycle i1 of a presently conducted processing operation of an external read request (FIG. 6) or of an external write request (FIG. 7). During cycle i1, while signal SX01 has a binary one value, the external read and write requests are being propagated in the address lines of connector bus UMI. However, during cycle i1, corresponding to cycle i0 of FIG. 3, index section DY1 of cache memory C1 is activated, causing a first word to be read in memory section M1 of cache memory C1. Consequently there is no conflict between simultaneous processing operations of the internal read request and the external read request or of an external write request because the requests do not operate on the same resources of processor CPU1.

The following cycle of clock source H, i.e., cycle i2 for the external request and cycle i1 for the internal request, also lacks conflict between the two requests. During cycle i2, indicated by the presence of signal XS02, index section DY1 of cache memory C1 is read for an external read request while index section DY1 of cache memory C1 is read for an external write request. Simultaneously, the intermediate, buffer register DTOR of cache memory C1 is responsive to the first word transmitted via the data lines of connector bus UMI from the external processor. During cycle i1 of the internal read request, the first word read in memory section M1 of cache memory C1 is transferred from the intermediate, buffer register DTOR to processor CPU1, under the control of signal PDT1. At the end of cycle i1, the second word in memory section M1 of cache memory C1 is transferred into buffer register DTOR, if there is a second word read from the memory section during cycle i1.

During cycle i2 of the external read or write requests, as illustrated in FIGS. 6 and 7, signal XSRUN has a binary one value. The binary one value of signal XSRUN prevents access of any internal request to index section DY1 and memory section M1 of cache memory C1, whereas any external request may make use of the index and memory sections of cache memory C1 at this time.

Signal XSRUN is derived by interruption call control circuit Te (the third means) of external sequencer XS. Signal XSRUN is coupled to synchronizing circuit Ie, thence to gate circuits Vi1, Vi2 . . . Vin of internal sequencer IS. The signals coupled by sequencer Ie to gates Vi1, Vi2 . . . Vin in response to signal XSRUN interrupt the operation of the gate circuits, and thereby interrupt the current processing of an internal request by sequencer IS and prohibit enabling of an internal request that has been derived by the processor unit associated with the cache memory.

Reference is now made to FIG. 4 of the drawing which is utilized in connection with a description of the manner in which an internal write request call for processor CPU1 is processed. Of course, an internal write request called for by processor CPU1 is a write operation performed in cache memory C1. In response to internal request ACRQ being enabled during cycle i0, processor CPU1 derives the address of the data to which it requires access. The address is coupled by processor CPU1 to index section DY1 of cache memory C1 by way of address lines AD1. By coupling the address signal to index section DY1, processor CPU1 is able to ascertain whether index section DY1 contains the information sought. If index section DY1 contains the sought information, processor CPU1 supplies a data word to memory section M1 during the following cycle i1 by way of data lines PDT1 connecting processor CPU1 to memory section M1 of cache memory C1. If the sought information contains two words, a second word is supplied by processor CPU1 to the next address in memory section M1 during cycle i2.

As described supra, internal request ACRQ cannot be enabled during cycle i0 unless signals XS01 and XSRUN both have binary zero values. Signals XS01 and XSRUN have binary one values to indicate that there is a present processing operation of an external request by cache memory C1. Because internal request ACRQ cannot be enabled during cycle i0 unless signals XS01 and XSRUN both have binary zero values, a conflict in simultaneous access to memory section M1 is averted. In particular, a possible conflict between writing a second word during processing of an internal request is avoided. The processing of internal request ACRQ is delayed if signals XS01 and XSRUN do not both have binary zero values during cycle i0.

If, however, internal request ACRQ is enabled during cycle i0, signal XS01 may be derived during cycle i1 to process the internal request which utilizes memory section M1. Signal XS01 is allocated to processing of an external request by processor CPU1. Processing of the external request occurs in response to an external processor deriving an external request that is accompanied by the external processor supplying address lines of connecting bus UMI of the address of information to which access is sought in cache memory C1. During the next cycle i2, processing of the internal request from processor CPU1 causes coupling of a second data word from processor CPU1 into memory section M1 of cache memory C1. In addition, during cycle i2, processing of an external write or read request from a processor unit different from processor CPU1 causes activation of index section DY1 of cache memory C1 in response to signal XS02, or activation of an addressing operation in response to signal BMAD. Thus, during cycle i2, there is an overlap between the processing of an external request and the processing of an internal request.

Reference is now made to FIG. 5 of the drawing which is utilized in connection with a description of the processing of an internal read request performed by cache memory C1, wherein cache memory C1 lacks the information sought by CPU1.

The internal request ACRQ from processor CPU1 is enabled during cycle i0. At the end of cycle i0, index section DY1 derives a signal to indicate that the information sought by processor CPU1 is not contained in cache memory C1. This signal is coupled to controller Ti. During cycle i1, cache memory C1 derives a call for access to connector bus UMI to interrogate the remainder of the data processing system. In response to the call for access to connector bus UMI being enabled, as indicated by signal LRQ having a binary one value, cache memory C1 supplies the address of the information it seeks. If it is assumed that connector bus UMI is immediately available, signal LRQ has a binary one value during cycle i1 and cache memory C1 derives the address of the information it seeks during cycle i2. Cache memory C1 is then ready and may process any external request affecting it if any such requests are applied to the cache memory. In FIG. 5 it is assumed that cache memory C1 receives a reply during cycle i4 from the processor unit which has the information sought by cache memory C1. Thereby, during cycle i4 the data lines of connector bus UMI transmit information sought by cache memory C1 to the cache memory, as indicated by signal BMTD having a binary one value. Data are exchanged between cache memory C1 and the processor containing the information on a one word per cycle basis of clock source H. Each word coupled to cache memory C1 by the data lines of connector bus UMI is stored in buffer register DTOR of cache memory, as indicated by signal DTOR having a binary one value. During cycle i5, the word supplied to register DTOR by the data lines of bus UMI during cycle i4 is coupled to memory section M1, as indicated by signal M1(C1) having a binary one level; thereby, at the beginning of cycle i6, register DTOR is empty and can receive the data word supplied to cache memory C1 by bus UMI during cycle i4. Simultaneously with register DTOR supplying a data word to memory section M1 during cycle i5, the contents of register DTOR are transferred to processing circuits included in processor CPU1 via lines PDT1, as indicated by signal PDT1 having a binary one value. Because it is assumed in the example of FIG. 5 that four data words are sequentially supplied to cache memory C1 from an external processor, the read operation is concluded at the end of cycle i8.

During cycle i4, the cycle during which cache memory C1 receives an indication of the unit which contains the information cache memory C1 seeks, the cache memory C1 cannot enable an external request because the reply call of the processor unit containing the information is being considered. Thereby, an external request call is held in abeyance. However, an external read request call may be enabled during cycle i5.

As indicated in FIG. 6, which indicates operation when an external read request is being derived from processor CPU1, signal XSRUN occurs two cycles after the cycle during which the external read request is enabled. As a result, derivation of an external read request during cycle i5 during processing of an internal request having the sequence illustrated in FIG. 5 causes signal XSRUN to have a binary one value during cycle i7. The derivation of signal XSRUN during cycle i5 does not interfere with the internal request sequence because the two requests utilize different resources of cache memory C1. During cycle i6 of an external read request operation, it is possible to obtain trouble free access to address lines of connector bus UMI since the internal request actually utilizes only the data lines of connector bus UMI during cycle i6. Consequently, there is an overlap without conflict between the processing operations of the two requests.

However, if an external write request is enabled during cycle i5 while an internal request is being processed, the external request may use the address lines of connector bus UMI during cycle i6. Utilization by the external request of the address lines of connector bus UMI during cycle i6 interrupts the external request associated with the address lines of connector bus UMI after cycle i6 since the internal request is using memory section M1. Interruption of the external request processing in processor CPU1 is indicated by a binary one level for signal DTBY (FIG. 5). Signal DTBY is derived by internal sequencer IS of cache memory C1 to interrupt the operation of external sequencer XS of cache memory C1. Interruption of external sequencer XS of cache memory C1 bars the external sequencer from access to memory section M1. The interrupt operation prevents conflicts between the processing operations associated with the two requests.

An internal request, while being processed, may prevent enabling of an external request or interrupt processing of an external request. In the examples illustrated, it has been assumed that two internal and external requests cannot gain access at the same time to the same resources of a processor; these resources being limited to the memory section and the index section of the cache memory. It is clearly possible to increase the number of resources to which two requests may not gain access simultaneously. The occurrence of signal XSRUN during processing of an external request does not prevent the processor in question from deriving internal requests, nor does it prevent the cache memory of the processor in question from being responsive to replies from other processor units in the system. The replies are considered by priority circuits (not shown) prior to being enabled. In the examples illustrated, signal XSRUN bars an internal request from access to the index section of a cache memory during the cycle while signal XSRUN is derived; signal XSRUN also prevents an internal request from accessing the memory section of the cache memory during the following cycle. Signal XSRUN is, of course, derived during processing of an external request. This operation in connection with signal XSRUN is compatible with the requirement that the two requests cannot gain simultaneous access during the same cycle to either the index section of the cache memory or to the memory section of the cache memory.

While there has been described and illustrated one specific embodiment of the invention, it will be clear that variations in the details of the embodiment specifically illustrated and described may be made without departing from the true spirit and scope of the invention as defined in the appended claims.

We claim:

1. A process for managing conflicts raised by multiple access to a single cache memory of a digital data processing system having: a main memory unit, N processor units CPU1, CPU2 . . . CPUk . . . CPUN, where k is selectively every integer from 1 to N, inclusive, an input-output unit, and a main connector bus connecting the units of the system; each processor unit including a cache memory containing a memory section and an index section for identifying data contained in the memory section, the processing of a task by processor unit CPUk including: deriving at least one request for access to at least one data item present in the cache memory of unit CPUk or in a processor unit CPUj or in the main memory unit, where j differs from k, an access request by processor unit CPUk to the cache memory of the processor unit CPUk being an internal request, enabling the internal request by the cache memory of processor unit CPUk, thereupon implementing the internal request in the cache memory of processor unit CPUk, the cache memory of processor unit CPUk responding to an external request derived by processor unit CPUj to process another task, calling at least one data item in the cache memory of processor unit CPUk for access via the connector bus, said process avoiding a conflict between processing of internal and external requests by the same cache memory while promoting the simultaneous processing of these requests, the process comprising: enabling an external request derived by processor unit CPUk and addressed to the cache memory of every processor unit CPUj, enabling the external request by the cache memory of every processor unit CPUj so the external request is considered by the cache memory of every processor unit CPUj, analyzing the external request in the cache memory of every processor unit CPUj, processing the external request by the cache memory of the one processor unit CPUj affected by this external request, the one affected processor unit being CPUg, authorizing the simultaneous processing by the cache memory of processor unit CPUg of internal and external requests provided that the internal and external requests are addressed to different resources of processor unit CPUg, and selectively interrupting the present processing of an internal request or preventing enabling of an internal request if the present processing of an external request requires all of the resources of processor unit CPUg or interrupting the present processing of an external request or delaying enabling of an external request if the present processing of an internal request requires all of the resources of processor unit CPUg.

2. The process of claim 1 wherein execution of an internal request or an external request by a cache memory of processor unit CPUk comprises: processing a series of read and write operations during a series of cycles of processor unit CPUk, initiating the first of the processing cycles in response to an enabled internal request or an enabled external request, during the first processing cycle enabling either an internal request or an external request and awarding priority to enabling an external request over an internal request in response to internal and external requests requiring simultaneous handling by the same cache memory, and authorizing simultaneous processing of the internal and external requests during following cycles of the system if they have access to different resources of the cache memory of processor unit CPUk.

3. The process of claim 2 further including establishing at the start of each processing cycle whether there are conditions applicable for performing (a) the next processing operation of an internal request or for enabling another internal request, or (b) the next processing operation on an external request, or (c) enabling another external request; the process comprising: incorporating into the conditions, either for the next operation in the processing of an internal request or for enabling another internal request, at least one enabling condition that is a function of the nature of the operation called for by processing of an external request then being executed; and incorporating into the conditions, either for the next operation in the processing of an external request or for enabling another external request, at least one enabling condition that is a function of the nature of the operation called for by processing of an internal request then being executed.

4. The process of claim 3 including the steps of delaying, at the start of a processing cycle, the next operation in the processing of an internal request and interrupting this internal request in response to a call for access to the connector bus of the system if the bus is already occupied or if the then prevailing external request has reserved a resource of the cache memory.

5. The process of claim 3 including the step of delaying, at the start of a processing cycle, enabling of an internal request relating to an operation for reading a data item of the cache memory of the processor into processor CPUj if a validated external request operates on the index section or on the memory section of the cache memory of the processor.

6. The process of claim 3 including the step of delaying, at the beginning of a processing cycle, enabling of an internal request relating to an operation for writing a data item contained in the cache memory of processor unit CPUk if an enabled external request already operates on the memory section or the index section of the cache memory of processor unit CPUk, or will be operating on the memory section or on the index section of the cache memory of processor unit CPUk during the following processing cycle.

7. The process of claim 3 including the step of delaying enabling of another external request if the nature of the operation then called for by the processing of an internal request is an operation for transfer of data via the connector bus between the cache memory of processor unit CPUk and the main memory unit of the system.

8. The process of claim 3 including the step of interrupting, at the start of a processing cycle, the next operation in the processing of an external request if this processing operation is applicable to the memory section of the cache memory while an internal request already operates on the memory section of the cache memory of processor unit CPUk.

9. A cache memory in a central processing unit of a digital data processing system wherein there is management of conflicts raised by multiple access to a single cache memory of the digital data processing system, the digital data processing system including: a main memory unit, N processor units CPU1, CPU2 . . . CPUk . . . . CPUN, where k is selectively every integer from 1 to N, inclusive, an input-output unit, and a main connector bus connecting the units of the system; the cache memory of each processor unit containing a memory section and an index section for identifying data contained in the memory section, the processing of a task by processor unit CPUk including: deriving at least one request for access to at least one data item present in the cache memory of unit CPUk or in a processor unit CPUj or in the main memory unit, where j differs from k, an access request by processor unit CPUk being an internal request, enabling the internal request by the cache memory of processor unit CPUk, thereupon implementing the internal request in the cache memory of processor unit CPUk, the cache memory of processor unit CPUk responding to an external request derived by processor unit CPUj to process another task, calling at least one data item in the cache memory of processor unit CPUk for access via the connector bus, said process avoiding a conflict between processing of internal and external requests by the same cache memory while promoting the simultaneous processing of these requests, the request processing including: enabling an external request derived by processor unit CPUk and addressed to the cache memory of processor unit CPUj, enabling the external request by the cache memory of every processor unit CPUk so the external request is considered by the cache memory of every processor unit CPUj, analyzing the external request in the cache memory of every processor unit CPUj, processing the external request by the cache memory of the one processor unit CPUj affected by this external request, the one affected processor unit being CPUg, authorizing the simultaneous processing by the cache memory of processor unit CPUg of internal and external requests provided that the internal and external requests are addressed to different resources of processor unit CPUg, and selectively interrupting the present processing of an internal request or preventing enabling of an internal request if the present processing of an external request requires all of the resources of processor unit CPUg or interrupting the present processing of an external request or delaying enabling of an external request if the present processing of an internal request requires all of the resources of processor unit CPUg; the cache memory Ck of processor unit CPUk comprising: first means for assuring synchronization between the different operations performed by cache memory Ck to provide for processing of an internal request derived by processor unit CPUk, second means for assuring synchronization between the different operations performed by cache memory Ck to assure the processing of an external request derived by any of processor units CPUj, third means for assuring a dialogue from said second means to the said first means by deriving signals for interrupting operation of said first means, and fourth means for assuring a dialogue from said first means to said second means by deriving signals for interrupting the operation of said second means.

10. The cache memory of claim 9 wherein said first means comprises a series of series connected flip-flops, a clock source for deriving periodic timing pulses supplied to said flip-flops and determining a series of cycles, a gate circuit associated with each flip-flop to enable the order for switching the associated flip-flop, internal control circuits for deriving output signals coupled to each of said gate circuits to establish switching conditions for each flip-flop as a function of an operation processed by cache memory Ck.

11. The cache memory of claim 10 wherein said second means comprises a second series of series connected flip-flops responsive to the pulses derived from said clock source, a gate circuit associated with each flip-flop of the second series to enable the order for switching said associated flip-flop, external control circuits for deriving output signals coupled to each of the gate circuits associated with the second series to establish switching conditions of each flip-flop of the second series as a function of the operations processed by cache memory Ck.

12. The cache memory of claim 9 wherein said second means comprises a clock source for deriving periodic timing pulses determining a series of cycles, a series of series connected flip-flops responsive to pulses derived from said clock source, a gate circuit associated with each flip-flop to enable an order for switching said associated flip-flop, external control circuits for deriving output signals coupled to each of said gate circuits to establish switching conditions of each flip-flop as a function of the operation processed by cache memory Ck.

13. The cache memory of claim 9, 10, 11 or 12 wherein said third means comprises a circuit for requesting interruption of the operation of said first means, said circuit deriving an output signal requesting interruption of the first means and being coupled to a gate circuit enabling a flip-flop of said first means to change state in the response to clock pulses.

14. The cache memory of claim 9, 10, 11 or 12 wherein said fourth means comprises a circuit for requesting interruption of the operation of the second means, said circuit deriving an output signal requesting interruption of said second means and being coupled to a gate circuit enabling a flip-flop of said second means to change state in response to clock pulses.

15. The cache memory of claim 9, 10, 11 or 12 wherein said third means comprises a first circuit for requesting interruption of the operation of said first means, said first circuit deriving an output signal requesting interruption of the first means and being coupled to a gate circuit enabling a flip-flop of said first means to change state in response to clock pulses and wherein said fourth means comprises a second circuit for requesting interruption of the operation of the second means, said second circuit deriving an output signal requesting interruption of said second means and being coupled to a gate circuit enabling a flip-flop of said second means to change state in response to clock pulses.

* * * * *